United States Patent
Zimmermann et al.

(10) Patent No.: US 6,947,841 B2
(45) Date of Patent: Sep. 20, 2005

(54) METHOD FOR IDENTIFYING OBSTACLES FOR A MOTOR VEHICLE, USING AT LEAST THREE DISTANCE SENSORS FOR IDENTIFYING THE LATERAL EXTENSION OF AN OBJECT

(75) Inventors: Uwe Zimmermann, Ludwigsburg (DE); Achim Pruksch, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,538

(22) PCT Filed: Oct. 22, 2002

(86) PCT No.: PCT/DE02/03973

§ 371 (c)(1),
(2), (4) Date: Jan. 14, 2004

(87) PCT Pub. No.: WO03/050562

PCT Pub. Date: Jun. 19, 2003

(65) Prior Publication Data

US 2004/0117115 A1 Jun. 17, 2004

(30) Foreign Application Priority Data

Dec. 7, 2001 (DE) .......................................... 101 60 299

(51) Int. Cl.[7] .......................... G01S 13/93; G06F 17/10
(52) U.S. Cl. ........................................ 701/301; 340/904
(58) Field of Search .................... 701/301, 96; 340/903, 340/904; 342/70

(56) References Cited

U.S. PATENT DOCUMENTS

| | | | |
|---|---|---|---|
| 5,529,138 A | * | 6/1996 | Shaw et al. .................. 180/169 |
| 5,638,281 A | | 6/1997 | Wang |
| 5,872,536 A | * | 2/1999 | Lyons et al. ................... 342/70 |
| 6,215,415 B1 | * | 4/2001 | Schroder .................. 340/932.2 |
| 6,498,972 B1 | * | 12/2002 | Rao et al. ....................... 701/45 |
| 6,580,385 B1 | * | 6/2003 | Winner et al. ................. 342/70 |
| 6,664,918 B2 | * | 12/2003 | Paradie et al. ................. 342/70 |

FOREIGN PATENT DOCUMENTS

| | | |
|---|---|---|
| DE | 42 42 700 | 6/1994 |
| DE | 196 16 038 | 10/1997 |
| DE | 196 22 777 | 12/1997 |
| DE | 197 49 397 | 5/1998 |
| DE | 198 55 400 | 6/2000 |
| DE | 199 49 409 | 4/2001 |
| DE | 100 11 263 | 9/2001 |
| EP | 1 068 992 | 1/2001 |
| WO | WO 00/73818 A1 * | 12/2000 |
| WO | 01 11388 | 2/2001 |

* cited by examiner

Primary Examiner—Michael J. Zanelli
(74) Attorney, Agent, or Firm—Kenyon & Kenyon

(57) ABSTRACT

In order to refine a method, as well as a system for detecting at least one object, in particular for detecting its specific parameters such as the relative position of the object or the relative speed of the object, such that the objects to be detected may be classified with respect to their spatial dimensioning, in particular with respect to their lateral extension, the spatial, in particular the lateral, extension of the object is detected using at least three distance-resolving units, mounted in particular on a means of transportation.

12 Claims, 3 Drawing Sheets

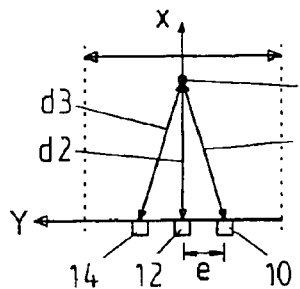
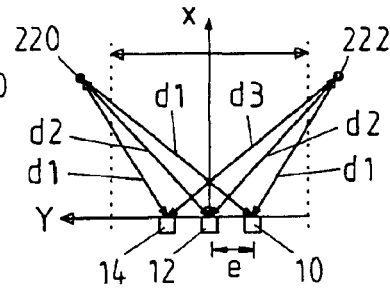
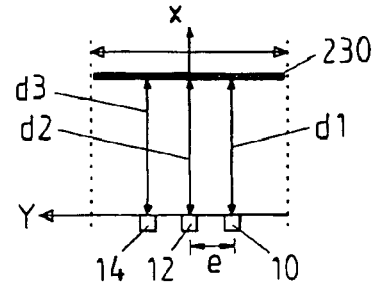
Fig. 1A  Fig. 2A  Fig. 3A
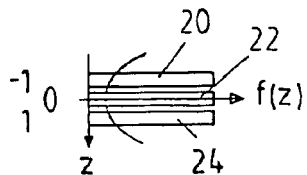
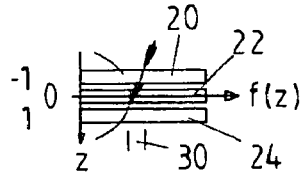
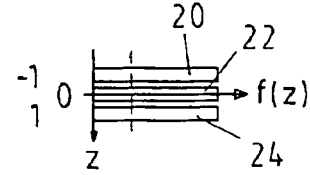
Fig. 1B  Fig. 2B  Fig. 3B
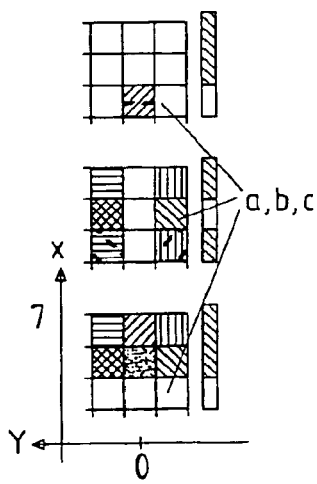
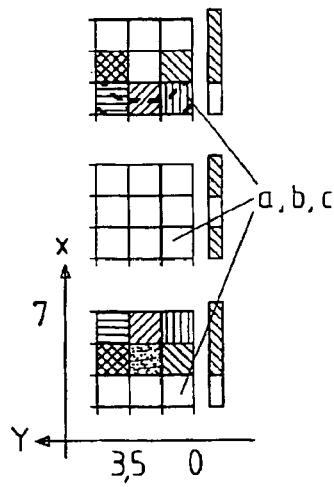
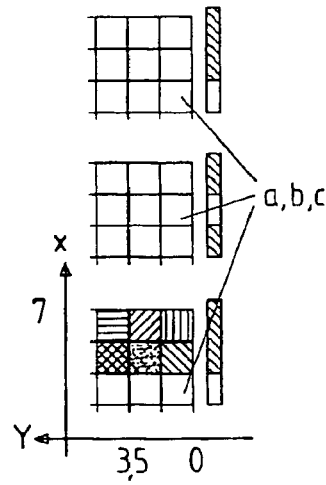
Fig. 1C  Fig. 2C  Fig. 3C

METHOD FOR IDENTIFYING OBSTACLES FOR A MOTOR VEHICLE, USING AT LEAST THREE DISTANCE SENSORS FOR IDENTIFYING THE LATERAL EXTENSION OF AN OBJECT

FIELD OF THE INVENTION

The present invention relates to a method, as well as a system, for detecting at least one object, in particular for detecting its specific parameters such as the relative position of the object or the relative speed of the object.

BACKGROUND INFORMATION

Conventional methods and systems for determining the position of objects using distance sensors such as 24-Gigahertz radar sensors are essentially based on the model of point target objects, where the distance lists of two or more individual 24 Gigahertz distance sensors are used as input variables.

From German Published Patent Application No. 42 42 700, an object detection system having a microwave radar sensor is known, which makes possible the detection of objects traveling ahead of a vehicle even at a greater distance. This radar sensor contributes to a vehicle safety system, which continuously processes information regarding the distance and the speed of the vehicle relative to the vehicles traveling ahead of it in a predefined angular range.

Furthermore, from German Published Patent Application No. 196 16 038, an object detection system is known, which has an optical transmitter for a light beam having a variable transmission angle and an optical receiver with angular resolving power. The transmitted light beam is modulated such that from the phase difference of the transmitted light beam and the received light beam, the position of the object is also determinable within the angular range of the transmitted light beam up to a certain distance.

In German Published Patent Application No. 196 22 777, a sensor system for the automatic relative position determination between two objects is disclosed. This conventional sensor system is a combination of an angle-independent sensor and an angle-dependent sensor. The sensor without angular resolving power, and thus angle-independent sensor, is configured as a sensor that analyzes the distance from an object via measurement of the travel time. Radar, lidar or ultrasonic sensors are proposed as possible sensors.

The angle-dependent sensor is a geometric arrangement of optoelectronic transmitters and receivers arranged in the form of photoelectric barriers. The sensors, both of which cover a common detection area, are located spatially close together. In order to determine a relative position to the object, the distance from the object is determined via the angle-independent sensor and the angle to the object via the sensor having angular resolving power. Based on the distance and the angle to the object, the relative position to the object is known. A proposed alternative to the above-mentioned arrangement of optoelectronic transmitters and receivers is the use of two sensors, which jointly determine the angle to the object according to the triangulation principle.

From German Published Patent Application No. 199 49 409, a method, as well as a device, for object detection via at least two distance sensors mounted on a motor vehicle are known, the detection areas of these sensors overlapping at least partially. Means are available for determining, according to the triangulation principle, relative positions of possible detected objects with regard to the sensors in the overlap area; possible ghost objects being created by the object determination may be established by dynamic object observations.

In German Published Patent Application No. 100 11 263, finally, an object detection system, in particular for a motor vehicle, is proposed, the object detection system having multiple object detectors and/or operational modes, with which various detection ranges and/or detection areas are detected. Here, an object detector may be a radar sensor having, in a first operational mode, a relatively large detection range with relatively small angular coverage and, in a second operational mode, a relatively small - by comparison - detection range with increased angular coverage.

In measurements using the above-mentioned conventional systems, in particular those based on 24-Gigahertz radar sensors, it was noted that in the case of real test objects, multiple centers of reflection are detectable, and it is therefore not assured that each sensor detects the same center of reflection.

SUMMARY OF THE INVENTION

Based on the disadvantages and inadequacies mentioned above, as well as viewed against the outlined related art, the object of the present invention is to refine a method, as well as a system, according to the definition of the species defined at the beginning, such that the objects to be detected may be classified with respect to their spatial dimensioning, in particular with respect to their lateral extension.

According to the teaching of the present invention, the effect that, in the case of real test objects, multiple centers of reflection are detectable, and that it is therefore not assured that each sensor detects the same center of reflection, is utilized in the sense that in sensor systems having at least three distance sensors, the objects are classified with regard to their spatial dimensioning, in particular with regard to their lateral extension. In a three-sensor system, measurement dropouts of short duration are preferentially backed up by a tracking algorithm, so that each sensor unit does not necessarily have to supply a distance value. In a three +n-sensor system, however, three supporting interpolation nodes are sufficient, but here, too, measurement dropouts of short duration are preferentially backed up by a tracking algorithm.

The concept of the present invention is also based on the assumption and experience that radar beams are reflected predominantly in the direction of the surface normal, which makes it possible to use existing 24-Gigahertz sensors in an advantageous manner according to the present invention.

Those skilled in the technical area of object detection via distance sensors will be able to appreciate, in the context of the present invention, in particular the possibility of differentiating between point target objects and spatial, large-area target objects. This differentiation provides at least rough indications for the size of the target object and thus its relevance, and is also of interest for the "PreCrash," Parking Assistance and ACC-Stop&Go applications.

According to a refinement essential to the present invention, the method, as well as the system, are expandable to spatially extensive objects obliquely positioned relative to the sensor system, for instance. In this way, orientations of spatially extensive objects relative to the sensor system and thus essentially trajectories of potential collision objects are able to be determined, which is relevant, among other things, to the estimation of the angle of impact in PreCrash-applications.

The present invention further relates to a device for the adaptive regulation of the distance and/or speed of travel of a means of transportation with regard to at least one object, operating according to a method of the type defined above and/or having at least one system of the type defined above.

Such a device for the adaptive regulation of the distance and/or the speed of travel is able to regulate, without intervention by the driver of the means of transportation, a previously set distance and/or a previously set speed of travel to at least one point of reference, in particular to at least one object of reference such as a vehicle traveling ahead or items and/or objects in the path of travel. This is done by taking into consideration the environment of the means of transportation and possibly other parameters such as weather and visibility conditions.

Such a device also goes by the name of Adaptive Cruise Control System (ACC-System). In particular in view of today's ever-increasing traffic density, the ACC system must be flexible enough to appropriately react to all driving situations. This, in turn, is ensured by the object-detection sensor technology according to the present invention, which appropriately supplies the measured data required for regulation in every driving situation. For instance, sensors for a freeway-compatible ACC system, usually radar or lidar sensors (lidar=acronym for "Light Detection and Ranging") are to be provided, which have a range of about 100 meters to 150 meters and a large angle of coverage.

Finally, the present invention relates to the use of a method of the type defined above and/or at least one system of the type defined above and/or at least one device of the type defined above as part of PreCrash sensing in a motor vehicle.

Here a sensor system determines whether a possible collision with the detected object such as another motor vehicle is about to happen. If there is a collision, the speed and point of impact are also determined. With knowledge of this data, life-saving milliseconds may be gained for the driver of the motor vehicle, during which preparatory measures may be taken such as, for instance, triggering of the airbag or tensioning of seatbelts.

Additional possible areas of application of the method and system according to the present invention are parking assistance systems (equipped with at least three short-range distance sensors, preferably using ultrasound sensors), blind-spot detection or a Stop&Go system as an expansion to an existing device for automatically regulating the speed of travel, such as an ACC system.

BRIEF DESCRIPTION OF THE DRAWINGS

FIG. 1A shows a model-like schematic view of a first traffic situation, where an object to be detected is located in the middle of the path of a motor vehicle, with the width of the path demarcated by dotted lines.

FIG. 1B shows a pattern, associated with the first traffic situation in FIG. 1A, in the distance lists of three sensor units.

FIG. 1C shows model coefficients, associated with the first traffic situation in FIG. 1A, for three different object positions (position in the median point of the particular segments) in the case of a point-shaped object with the sensor zero being (0;0).

FIG. 2A shows a model-like schematic view of a second traffic situation, where two objects to be detected are located symmetrically to the longitudinal axis of a motor vehicle, with the width of the path demarcated by dotted lines.

FIG. 2B shows a pattern, associated with the second traffic situation in FIG. 2A, in the distance lists of three sensor units, with the minimum distances in the cluster marked by two arrows.

FIG. 2C shows model coefficients, associated with the second traffic situation in FIG. 2A, for three different object positions (position in the median point of the particular segments) according to three different symmetric arrangements of two point-shaped objects, with the sensor zero being (0;0).

FIG. 3A shows a model-like schematic view of a third traffic situation, where a spatially extensive object to be detected is located perpendicular to the longitudinal axis of a motor vehicle, with the width of the path demarcated by dotted lines.

FIG. 3B shows a pattern, associated with the third traffic situation in FIG. 3A, in the distance lists of three sensor units.

FIG. 3C shows model coefficients, associated with the third traffic situation in FIG. 3A, for three different object positions (position in the median point of the particular segments) in the case of an object whose area extends perpendicular to the x-axis, with the sensor zero being (0;0).

DETAILED DESCRIPTION

Figures 4, 5:
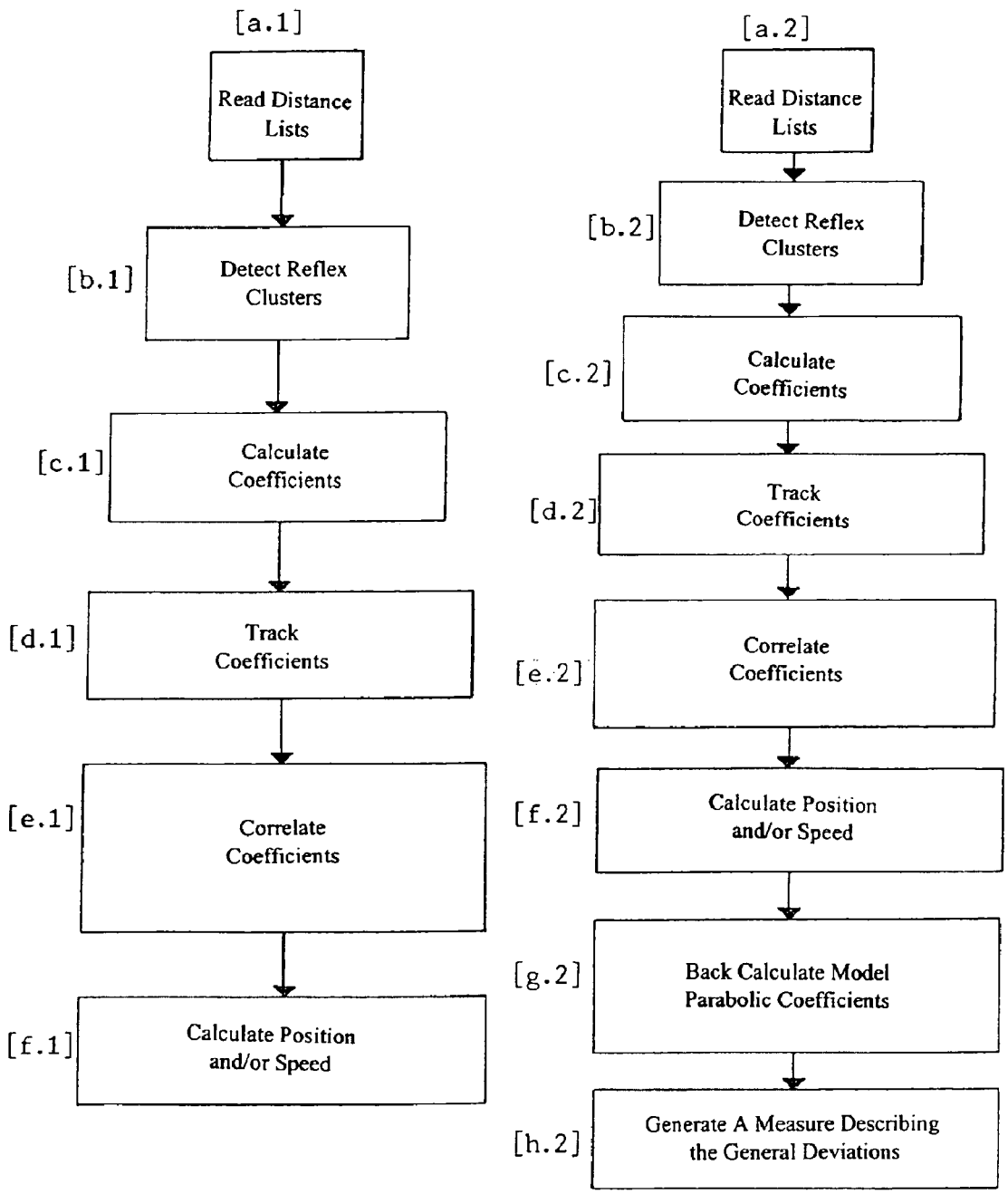
FIG. 4 is a schematic representation of a first embodiment of the method according to the present invention in the form of a flow chart.
FIG. 5 is a schematic representation of a second embodiment of the method according to the present invention in the form of a flow chart.
Figure 6:
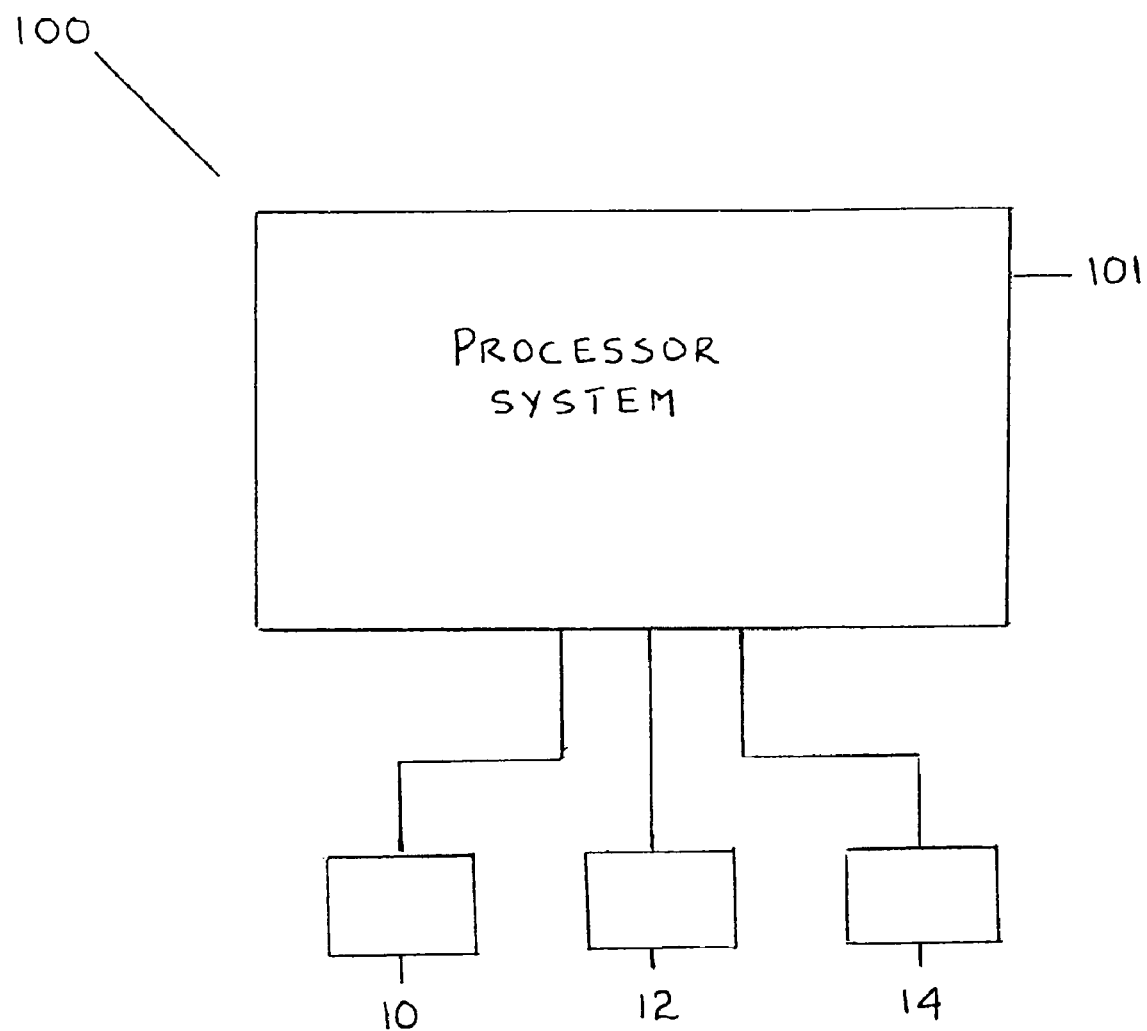
FIG. 6 shows the system 100 which includes a processor arrangement 101 that is coupled to the sensors 10, 12 and 14.

In the following, the method according to the present invention is explained using a system 100 having a processor arrangement 101 and three sensor units 10, 12, and 14, as an example.

Three sensor units 10, 12, 14 are positioned at a distance e in relation to one another. In addition, FIGS. 1A, 2A and 3A show typical distance distributions for a point-shaped object 210 (see FIG. 1A), for two point-shaped objects 220, 222, positioned symmetrically to the x-axis (see FIG. 2A), as well as for an object 230 whose area extends perpendicular to the x-axis (see FIG. 3A).

By applying a curve f(z) suitably a parabola having coefficients a, b and c (=polynomial of the second order: $f(z)=a \cdot z^2+b \cdot z+c$) through each of the smallest distances d1min, d2min, d3min of clusters 30, it becomes apparent that a parabola having an aperture facing up (see FIG. 1B) for individual object 210 (see FIG. 1A) and a parabola having an aperture facing down (see FIG. 2B) for both objects 220, 222 positioned symmetrically to the longitudinal axis of the motor vehicle (see FIG. 2A) runs through the distance values on the longitudinal axis of a motor vehicle;

and that for large-area object 230 the distances for each sensor unit 10, 12, 14 are drawn in the direction of the particular surface normals (see FIG. 3B).

According to the graphs of FIGS. 1B, 2B and 3B, in this context the ordinate values f(z) represent the smallest distance values d1min, d2min, d3min; for the abscissa values z, arbitrary values simplifying calculation are introduced for each sensor unit 10, 12, 14 in the form of radar, that is, z=−1 for sensor unit 10, z=0 for sensor unit 12, and z=1 for sensor unit 14. As a result, models may be formed in front of sensor system 10, 12, 14 for evaluating patterns in distance lists 20, 22, 24 of three sensor units 10, 12, 14 for typical arrangements of point-shaped objects 210 (see FIGS. 1A and 1B), or 220, 222 (see FIGS. 2A and 2B), as well as of extensive object 230 (see FIGS. 3A and 3B).

FIGS. 1C or 2C or 3C show coefficients a, b, c associated with the particular parabolas for various positions of objects 210 or 220, 222 or 230. Here the area (for example, 0 m<x<7 m in the x direction and −3.5 m<y<3.5 m in the y direction) is subdivided, to give an example, into nine segments in front of sensor system 10, 12, 14.

For example, if an individual point-shaped object 210 is located at position (x=3.5 m; y=2.33 m), then a positive value is obtained for first coefficient a, while a negative value is obtained for second coefficient b. This is the case within the constellation of the first traffic situation of FIGS. 1A, 2A, 3A, where positive coefficient a, which represents a factor before the highest polynomial order $z^2$, is responsible for the aperture of the parabola facing up (see FIG. 1B).

If, however, there is an object 220, 222 at positions (x=3.5 m, y=2.33 m) and (x=3.5 m; y=−2.33 m), then a negative value is obtained for first coefficient a, while second coefficient b disappears, that is, second coefficient b is equal to zero. This is the case in the constellation of a second traffic situation in FIGS. 1B, 2B and 3B, where the now negative coefficient a, which represents a factor before the highest polynomial order z, is responsible for the aperture of the parabola facing down (see FIG. 2B).

As the embodiments of FIGS. 4 and 5 illustrate, the actual method according to the present invention may be used to assign coefficients a, b, c calculated from the measured data to the model coefficients generated by the models in order to specifically decide by correlation whether the detected object is an individual point-shaped object 210, point-shaped objects 220, 222 positioned symmetrically relative to the longitudinal axis of the vehicle, or a spatially extensive object 230.

To accomplish this, according to the first embodiment of FIG. 4, distance lists 20 or 22 or 24 of the three sensor units 10 or 12 or 14 are read in in a first procedural step [a.1]. Here, first distance list 20 relates to first distance value d1, second distance list 22 relates to second distance value d2, and third distance list 24 relates to third distance value d3 (see FIGS. 1B, 2B and 3B).

After reflex clusters 30 are subsequently detected in distance lists 20, 22, 24 in a second procedural step [b.1], coefficients a, b, c are calculated (=third procedural step [c.1]) from the particular smallest distance values d1min, d2min, d3min in clusters 30.

The next and fourth procedural step [d.1] involves tracking coefficients a, b, c, where the values of the coefficients a, b, c and their functional derivations based on time t must remain within physically meaningful limits; this means, in other words, that coefficients a, b, c assigned to measured distance values d1, d2, d3, as well as the coefficients' derivations based on time t, must be filtered in a fourth procedural step [d.1] to determine whether results fall below the specifically defined lower threshold values as well as whether they exceed specifically defined upper threshold values.

As a result, a subsequent fifth procedural step [e.1] is able to use a correlation of coefficients a, b, c with model coefficients obtained from model data to distinguish between an individual point-shaped object 210, symmetrically positioned point-shaped objects 220, 222, and an extensive object 230.

A sixth and final procedural step [f.1] calculates the position and relative speed of particular objects 210 (see FIGS. 1A, 1B and 1C), 220, 222 (see FIGS. 2A, 2B and 2C), and 230 (see FIGS. 3A, 3B and 3C) from filtered coefficients a, b, c, as well as from time-based derivations of the coefficients.

In contrast to the first embodiment of the method according to the present invention (see FIG. 4), the second embodiment of the method according to the present invention (see FIG. 5) performs the classification solely on the basis of model assumptions for point-shaped objects. Here the object positions are first calculated from tracked parabolic coefficients a, b, c (=sixth procedural step [f.2] in FIG. 5).

In contrast to FIG. 4, a subsequent additional seventh procedural step [g.2] then performs a back calculation of the model parabolic coefficients for ideal point-shaped objects at these positions. Based on the deviations of tracked parabolic coefficients a, b, c relative to the back-calculated model parabolic coefficients, a second embodiment of the present invention according to FIG. 5 uses a final eighth procedural step [h.2] to generate a measure which describes the general deviation from a point-shaped object, thereby enabling conclusions to be drawn about the extent of the object.

Regarding the flow chart in the case of the second exemplary embodiment of the present method according to FIG. 5, it should be noted that first six procedural steps [a.2], [b.2], [c.2], [d.2], [e.2], [f.2] correspond to first six procedural steps [a.1], [b.1], [c.1], [d.1], [e.1], [f.1] in the flow chart of the first exemplary embodiment according to FIG. 4, where fifth procedural step [e.2] according to FIG. 5 is only able, of course, to distinguish between an individual point-shaped object 210 and symmetrically positioned point-shaped objects 220, 222.

Regarding the present invention, it should be noted in conclusion that refinements of the model are possible such as in the case of extensive objects positioned obliquely to sensor system 10, 12, 14.

When implementing the present method and associated system 100, the following potentially limiting factors should be considered:

the distance resolution of individual sensors 10, 12, 14 and/or the measuring accuracy of individual sensors 10, 12, 14 and/or the high potential for close distances d1, d2, d3 to sensor system 10, 12, 14, because here in the example of individual point-shaped object 210 there may be large differences between distance values d1, d2, d3, and/or usual fluctuations of the backscatter cross-sections for radar transmissions (when using radar sensors) that may lead to an impairment of the (idealized) model assumptions; for this reason it is advisable, for instance, to suitably filter the figure formed according to the second embodiment in FIG. 5.

LIST OF REFERENCE MARKINGS 100 system
10 first sensor unit
12 second sensor unit
14 third sensor unit
20 first distance list for first distance value d1
22 second distance list for second distance value d2
24 third distance list for third distance value d3
30 (reflex) cluster
210 individual point-shaped object
220, 222 two symmetrically positioned point-shaped objects
230 extensive object
a first coefficient
b second coefficient
c third coefficient
d1 first distance value
d1min first minimum distance value
d2 second distance value
d2min second minimum distance value
d3 third distance value
d3min third minimum distance value
e distance of sensor units 10, 12, 14 from each other
t time

We claim:

1. A method for detecting at least one object, comprising:

detecting a spatial extension of the at least one object using at least three distance-resolving units mounted on a transportation apparatus by assigning coefficients to measured minimum distance values and assigning the coefficients to model coefficients that characterize the spatial extension of the at least one object.

2. The method as recited in claim 1, wherein:

the spatial extension corresponds to a later extension of the at least one object.

3. The method as recited in claim 1, wherein:

the method is for detecting a parameter of the at least one object, the parameter including one of a relative position of the at least one object and a relative speed of the at least one object.

4. The method as recited in claim 1, further comprising:

measuring, using at least one of the at least three distance-resolving unit, distance values between the at least one object and an associated ones of the at least three distance-resolving units, in order to produce measured distance values corresponding to measured minimum distance values;

wherein in the assigning of the coefficients to the measured minimum distance values, the coefficients belong to at least one polynomial ($f(z) = a \cdot z^n + b \cdot z^{n-1} + \ldots + c$) of the $n^{th}$ order, n being a natural number greater than 1.

5. The method as recited in claim 4, wherein:

by assigning the coefficients to the model coefficients, the spatial extension is recognized and differentiated of the at least one object in the form of one of:
   at least one individual point-shaped object,
   at least two symmetrically positioned point-shaped objects, and
   at least one extended object.

6. The method as recited in claim 4, further comprising:

combining the measured distance values in the form of distance lists; and recognizing reflex clusters in the distance lists.

7. The method as recited in claim 4, further comprising:

tracking the coefficients by:
   continuously measuring as a function of time the distance values, and
   filtering the coefficients assigned to the measured distance values, the coefficients belonging to at least one polynomial ($f(z) = a \cdot z^n + b \cdot z^{n-1} + \ldots + c$) of the $n^{th}$ order, n being a natural number greater than 1, as well as derivations based on time of the distance values, with respect to whether at least one of results fall below defined lower threshold values and exceed defined upper threshold values.

8. The method as recited in claim 7, further comprising:

calculating one of a relative position of the at least one object and a relative speed of the at least one object from one of the filtered coefficients and the time (t)-based derivations with regard to at least one reference point defined by locations of the sensor units.

9. The method as recited in claim 7, wherein:

the model coefficients for point-shaped objects are calculated at a calculated relative position and compared with the filtered coefficients, and subsequently a measurement is generated for a deviation of a target object from a point shape.

10. A system for detecting at least one object, comprising:

a processor arrangement; and at least three distance-resolving units mounted on a transportation apparatus and for detecting a spatial extension of the at least one object with the processor arrangement, by assigning coefficients to measured minimum distance values and assigning the coefficients to model coefficients that characterize the spatial extension of the at least one object.

11. The system as recited in claim 10, wherein:

the system is for detecting a parameter of the at least one object, the parameter including one of a relative position of the at least one object and a relative speed of the at least one object.

12. The system as recited in claim 10, wherein:

the spatial extension corresponds to a later extension of the at least one object.

* * * * *